Patented Nov. 27, 1951

2,576,205

UNITED STATES PATENT OFFICE 2,576,205

DENTURE CLEANSING COMPOSITION

Lester D. Apperson, Flushing, N. Y., assignor to Colgate-Palmolive-Peet Company, Jersey City, N. J., a corporation of Delaware No Drawing. Application August 25, 1945, Serial No. 612,706

2 Claims. (Cl. 252—99)

This invention relates to a novel and highly efficient composition for cleaning dentures or removable artificial teeth.

Many types of compositions have been developed for cleaning removable artificial teeth. Most, if not all, such compositions are not as efficient as is desired, and require brushing to achieve a satisfactory result. Others are of such a nature that they attack, discolor or corrode the plastic base in which the teeth are set. In some cases the teeth themselves are adversely affected by the cleaning preparation. These effects are increased by long contact of the teeth with the cleaning composition, a common practice, such as leaving the artificial teeth in a cleansing bath for hours or overnight.

It is an object of this invention to provide a highly efficient cleansing preparation for removable teeth.

It is another object of this invention to provide an efficient cleaning preparation for removable artificial teeth which will not affect the plastic or base of the artificial teeth nor the teeth themselves.

Other objects will be apparent from the disclosures contained hereinafter.

I have found that hydrogen peroxide addition compounds admixed with other substances, so that a water solution of the preparation will have sufficient alkalinity to dissolve mucin and also to decompose the peroxide, releasing oxygen rapidly enough to act as an agitator for the solution and thus dislodge adhering materials, provide excellent cleaning solutions for removable dentures which are harmless to the denture. Solutions of the compositions herein disclosed will evolve oxygen fairly rapidly over a considerable period of time, and, at the same time, the alkalinity of these solutions will not be so high as to cause harm to the denture or to decompose the peroxide compound too rapidly. The alkalinity of the solution depends upon the particular hydrogen peroxide addition agent employed, and in general will have a pH of about 10.2 to 11.5 for a 1% to 3% solution (at about 25° C.)

The pH of the cleaning solution should not be so high that the peroxide decomposes to give off the oxygen too rapidly, that is, within a very short period of time. The evolution of oxygen should take place over at least several minutes and preferably should take place over at least thirty minutes (for a 3% solution).

The hydrogen peroxide addition products are illustrated by such compounds as sodium carbonate peroxide ($Na_2CO_3 \cdot xH_2O_2$, where $x$ may be one or more of several different possibilities, such as $Na_2CO_3.H_2O_2$; $Na_2CO_3 2H_2O_2$; and $Na_2CO_3 1.5H_2O_2$; and even where water of hydration may be present, such as $Na_2CO_3 \cdot H_2O \cdot 1.5H_2O_2$), tetrasodium pyrophosphate peroxide $(Na_4P_2O_7 \cdot 2.5H_2O_2)$, or urea peroxide ($CO(NH_2)_2 \cdot H_2O_2$).

Sodium perborate ($NaBO_2 \cdot H_2O_2$ or $NaBO_2 \cdot H_2O_2 \cdot 3H_2O$)

is the best known of the hydrogen peroxide addition compounds. These perborates, however, are relatively stable in solution and evolve oxygen very slowly. I have found that increasing the alkalinity of solutions of these perborates to a pH of 10.8 or higher (about 3% solution) brings about a more rapid evolution of oxygen and results in a more efficient denture cleanser.

However, high alkalinity may cause damage to the denture. Therefore, it is necessary to use a peroxide compound which will readily give up oxygen at a pH which is not injurious to the denture. The hydrogen peroxide addition products, other than the perborates, are effective over a pH range of about 10.2 to about 11.0 (3% solution), and the perborates are effective over a pH range of about 10.8 to a pH which would be harmful to the denture. Thus, perborates should not be used at a pH above about 11.5. Perborates may be used with the other hydrogen peroxide addition compounds at the pH at which the other compound used is effective. Here they serve as alkaline builders or agents. They may also be used at the pH at which they and the other peroxide compounds are both effective (a pH of 10.8 to 11.0).

On the other hand, a 3% solution of tetrasodium pyrophosphate peroxide has a pH of about 9.3. Such a solution is a poor denture cleanser, since the peroxide addition compound is too stable at this pH to evolve any appreciable amount of oxygen and the only cleaning is that due to alkalinity alone. If some alkaline builder such as sodium carbonate is added, to raise the pH of the solution to about 10.2, then oxygen begins to come off slowly and the efficiency of the cleanser is greatly increased, since there is cleaning due to both alkalinity and agitation by the oxygen. If sufficient alkaline builder is added to give a pH of 10.55, then oxygen is released rapidly in solution and a very good cleaning action is obtained. The cleaning action can still be increased by further increasing the pH, but in doing so precaution must be taken that the alkalinity is not raised to a point which is harmful to the denture, and it is desirable that solutions used for such cleaning have a pH below 11.0.

Other ingredients necessary or desirable in these new compositions for cleaning dentures include buffers to maintain a pH of the composition containing the peroxide compounds other than perborates in solution at about 10.2 to about 11.0 (for perborates, at 10.8 to 11.5), and preferably as near 10.5 to 10.6 as possible (about 11.0 to 11.2 for perborates), substances which serve to stabilize the peroxide addition compounds to prevent the release of oxygen before usage, and flavoring agents, germicidal agents and wetting agents.

The following indicates the types of agents which have a stabilizing effect upon the peroxide addition compounds: pyrophosphates, citric acid, magnesium silicate, sodium silicate, and the like.

As buffering agents, these may be used: borax, citric acid, borates, carbonates, phosphates, and pyrophosphates. Other buffers may be used so long as they achieve the desired pH and do not adversely affect the dentures or react with any other ingredient of the preparation.

A wetting agent or detergent is preferably added in sufficient proportion to insure ready wetting of the removable dentures and to assist penetration of the mucin plaques and other substances to be removed. These may include detergents or wetting agents which are stable under alkaline conditions. Salts of long-chain sulphonates, alkyl-aryl sulphonates, long-chain alcohol sulphates, secondary alcohol sulphates, the salt of a fatty acid condensed with taurine $$(R—COO—NH—CH_2—CH_2SO_3Na)$$

and the like may be used.

These new compositions are far more effective in cleansing removable dentures than any previously known preparation which can be used without danger to the artificial teeth. These compositions remove mucin plaques with remarkable effectiveness and facility, and have no deleterious effect on the dentures.

The proportions of the ingredients may be varied over wide ranges. It is preferred to incorporate in the compositions from about 10% to 75% of the hydrogen peroxide addition compounds, depending to some degree upon the particular compound employed and to some degree upon the available oxygen in it. Also, the pH of the compound in solution will influence the proportion to be used, since the proportions of buffering agents will depend, at least in part, upon that characteristic of the addition compound. The nature of the essential ingredient, the peroxide compound, will dictate the proportions of buffering agents, and the type and quantity of the stabilizer, if any, to be used.

It will be understood that these compositions should be prepared in the dry state and should be kept in that state until they are used. Dissolution of them in water starts the decomposition of the peroxide addition compounds, during which time oxygen is given off. This, the giving off of oxygen, is essential to the effective cleaning operation of these novel compositions; hence it must be prevented until they are to be used.

The following examples are intended to illustrate, but not to limit, the principle of this invention.

*Example I*

| | |
|---|---|
| Sodium carbonate peroxide (Ratio of $Na_2CO_3$ to $H_2O_2$ of 1:1.5) | Per cent 40 |
| Tetrasodium pyrophosphate | do 30 |
| Salt (NaCl) | do 25 |
| Sodium salt of oleyl tauride (Igepon T) | do 5 |
| Flavor | Q. S. |

This composition has a pH in a 3% solution of approximately 10.55. Its warm water (40° to 50° C.) solution evolves oxygen fairly rapidly and cleans removable dentures well, removing dried mucin plaques readily and effectively.

*Example II*

| | Per cent |
|---|---|
| Sodium carbonate peroxide (1:1.5) | 50 |
| Salt (NaCl) | 25 |
| Tetrasodium pyrophosphate | 20 |
| Alkyl aromatic sulphonate detergent, Na salt | 5 |

This preparation has a pH of approximately 10.6 in a 3% solution, and in solution is an effective cleansing agent for artificial teeth.

*Example III*

| | Per cent |
|---|---|
| Urea peroxide | 70 |
| Sodium carbonate | 30 |

This composition has a pH of about 10.5 in a 2.8% solution, and is effective but harmless to the removable dentures.

*Example IV*

| | |
|---|---|
| Tetrasodium pyrophosphate peroxide | Per cent 30 |
| Sodium carbonate | do 40 |
| Salt (NaCl) | do 25 |
| Sodium salt of Oleyl tauride | do 5 |
| Flavor | Q. S. |

This composition in solution of about 3% has a pH of 10.8 and is an excellent cleanser of removable dentures, readily removing mucin plaques and leaving the denture in unusually clean condition.

*Example V*

| | Per cent |
|---|---|
| Sodium carbonate peroxide | 35 |
| Tetrasodium pyrophosphate | 35 |
| Salt (NaCl) | 25 |
| Sodium salt of oleyl tauride | 5 |

This composition has a pH of 10.6 in solution of 3%, is a good cleanser for removable dentures, and, as those set out hereinbefore, is harmless to them.

*Example VI*

| | Per cent |
|---|---|
| Sodium carbonate peroxide | 50 |
| Tetrasodium pyrophosphate | 20 |
| Sodium sulphate | 25 |
| Sodium lauryl sulphate | 4 |
| Flavor | 1 |

This composition has a pH of 10.6 in a 3% solution. It is a good denture cleanser.

*Example VII*

| | Per cent |
|---|---|
| Tetrasodium pyrophosphate peroxide | 50 |
| Sodium carbonate | 25 |
| Salt | 20 |
| Sodium salt of oleyl tauride | 5 |

This composition has a pH of 10.5 in 3% solution, and is an effective cleanser.

Example VIII

| | Per cent |
|---|---|
| Sodium carbonate peroxide | 20 |
| Tetrasodium pyrophosphate | 20 |
| Salt | 45 |
| Sodium carbonate | 10 |
| Sodium salt of oleyl tauride | 4 |
| Flavor | 1 |

This composition has a pH of 10.55 in 3% solution and cleans removable dentures well without harm thereto.

Example IX

| | Per cent |
|---|---|
| Sodium carbonate peroxide | 20 |
| Tetrasodium pyrophosphate | 20 |
| Sodium carbonate | 10 |
| Sodium perborate | 10 |
| Salt | 25 |
| Sodium salt of oleyl tauride | 4 |
| Flavor | 1 |

This composition has a pH of 10.6 in 3% solution, and is a very satisfactory cleanser for removable dentures.

Example X

| | Per cent |
|---|---|
| Sodium perborate | 40 |
| Sodium carbonate | 30 |
| Trisodium phosphate | 25 |
| Sodium lauryl sulphate | 4 |
| Flavor | 1 |

This composition has a pH of 11.25 in 3% solution, gave off considerable oxygen and removed mucin plaques well. (The pH determinations for this and the other examples were made at about 25° C.)

In the examples, other alkalies, such as sodium silicate and trisodium phosphate, may be used instead of sodium carbonate. Although the examples include sodium chloride or sodium sulphate, these are not essential ingredients. The compositions of all of the examples evolved oxygen sufficiently to aid materially in the cleaning action.

The preparations may be made by mixing the ingredients in the dry state in procedures that will suggest themselves to those skilled in the art of compounding such products. If more intimate mixing, or any other result, is desired, any mixture may be dissolved in a common solvent, save the peroxide addition compound, then dried, and the dried mixture mixed with the dry peroxide compound.

Other dry ingredients may be admixed with these preparations, but it is preferred that no substance be included which lessens the stability of the peroxide compound or materially changes the pH of the composition in solution.

The examples include only three specific detergents, but it should be understood that other detergents and wetting agents may be substituted therefor in part or completely. In general, they may be present in various proportions, depending upon the effectiveness of the particular agent, but about 2% to 10% is a satisfactory proportion.

It should not be understood from the foregoing disclosures that only a 3% solution of these compositions is to be used.

A wide range of concentrations is effective, but it will generally be preferred to use those between about 1% to 5%.

The function of the oxygen given off by the peroxide has been referred to as agitation. It is believed that this is the primary function of the oxygen. Whatever may be the part played by the oxygen given off by the peroxide, a more effective cleansing results when oxygen is evolved in the cleansing solution than when it is not.

I claim:

1. A stable, dry composition which when added to water produces an efficient denture-cleansing agent comprising about 20% sodium carbonate peroxide, about 20% tetrasodium pyrophosphate, about 45% salt, about 10% sodium carbonate, about 4% sodium salt of oleyl tauride, and flavoring material.

2. A denture-cleansing composition comprising about 20% sodium carbonate peroxide, about 20% tetrasodium pyrophosphate, about 10% sodium carbonate, about 2% to 10% wetting agent from the group consisting of water-soluble salts of synthetic organic non-soap sulphate and sulphonate detergents, an effective amount up to about 1% flavor and the balance sodium chloride.

LESTER D. APPERSON.

REFERENCES CITED

The following references are of record in the file of this patent:

UNITED STATES PATENTS

| Number | Name | Date |
|---|---|---|
| 941,158 | Mausolff | Nov. 23, 1909 |
| 1,000,298 | Sarason | Aug. 8, 1911 |
| 1,978,953 | McKeown | Oct. 30, 1934 |
| 2,094,671 | Poetschke | Oct. 5, 1937 |
| 2,121,952 | Colonius et al. | June 28, 1938 |
| 2,152,520 | Lind | Mar. 28, 1939 |
| 2,409,718 | Shell et al. | Oct. 22, 1946 |
| 2,498,343 | Rider et al. | Feb. 21, 1950 |

FOREIGN PATENTS

| Number | Country | Date |
|---|---|---|
| 425,804 | Great Britain | Mar. 21, 1935 |